UNITED STATES PATENT OFFICE.

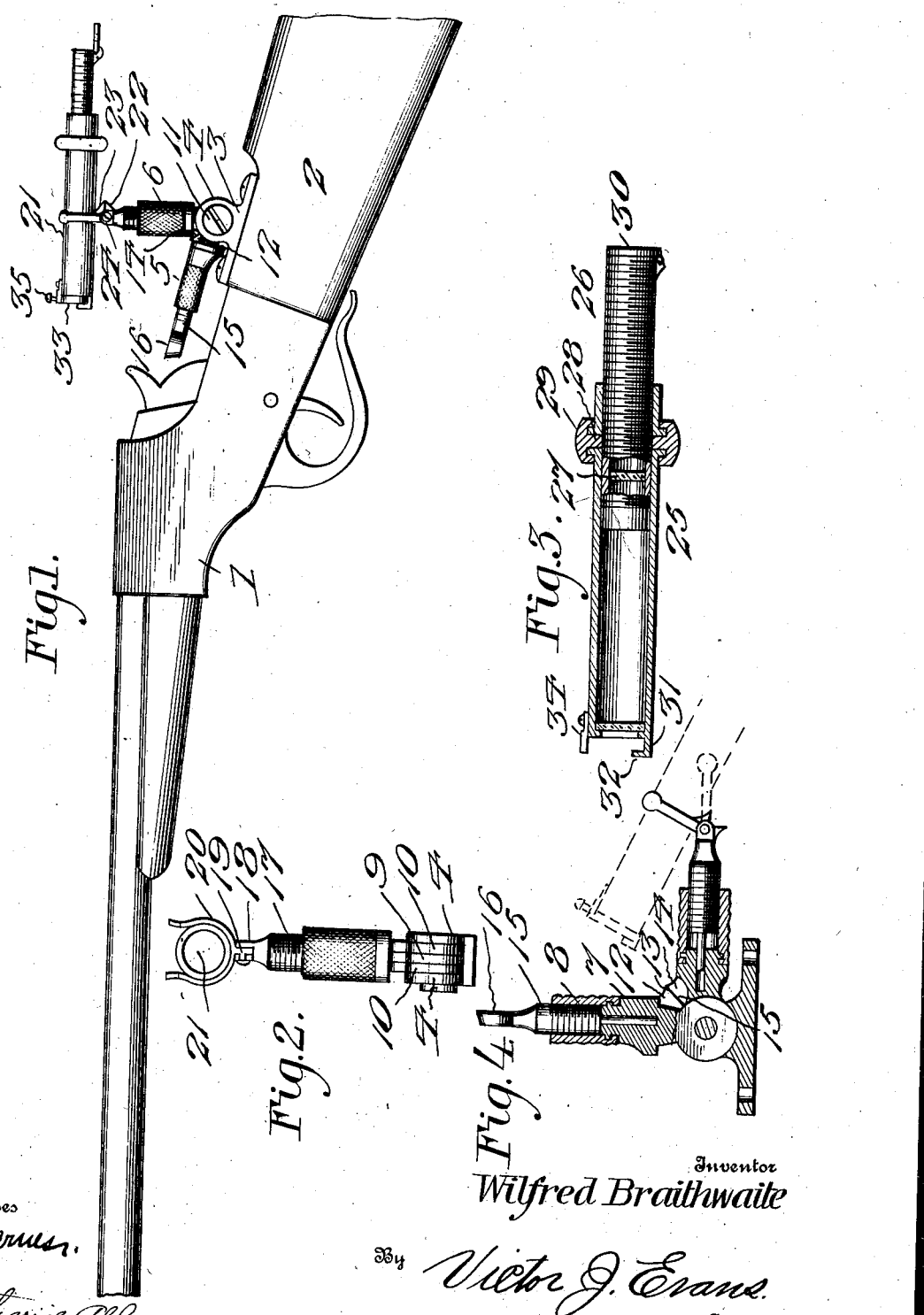

WILFRED BRAITHWAITE, OF MIDDLEFIELD, CONNECTICUT.

GUN-SIGHT.

No. 810,258.  Specification of Letters Patent.  Patented Jan. 16, 1906.

Application filed August 19, 1905. Serial No. 274,921.

*To all whom it may concern:*

Be it known that I, WILFRED BRAITHWAITE, a citizen of the United States, residing at Middlefield, in the county of Middlesex and State of Connecticut, have invented new and useful Improvements in Gun-Sights, of which the following is a specification.

The invention relates to an improvement in gun-sights, and particularly to a mounting for telescopic sights.

The main object of the present invention is the production of a mount arranged to accommodate two individual standards or a particular specific sight.

The invention will be described in detail in the following specification, reference being had to the accompanying drawings, in which—

Figure 1 is a view in side elevation, illustrating the application of my improved sight-mounting to a gun. Fig. 2 is an end elevation of the mounting. Fig. 3 is a longitudinal section of the telescopic sight. Fig. 4 is a vertical section illustrating the respective arrangements of the stems.

Referring to the drawings, 1 represents a rifle of any preferred construction, to the stock 2 of which immediately in rear of the trigger is secured my improved mounting.

The mounting comprises a metallic plate 3, designed to be removably secured to the stock and formed intermediate its length with vertically-projecting ears 4, preferably circular in plan beyond their connection with the plate. The mounting is adapted to movably receive stems 5 and 6, the former hereinafter termed the "sight-stem" and the latter the "telescope-stem." Each of the stems comprises barrels 7, cored at the upper end and interiorly screw-threaded, as at 8, or, if desired, the cored portion may be separated from the barrel of the stem and movably or fixedly secured thereto. The stem 5 is provided at its lower end with a single projecting leaf 9, circular in shape and coextensive in size with the ears 4 of the mounting. The telescope-stem is provided with two depending circular ears 10, arranged in parallel relation and equal in size to the leaf 9 projecting from the sight-stem. The leaves 10 are so arranged as to be movably received between the ears 4 of the mounting and are so spaced apart as to receive the leaf 9 between them. By this construction the leaves 9 and 10 are inserted between the ears 4 projecting from the mounting, and the pivotal connection of said stems with the mounting, secured by a transverse pin or screw 11, pass through the ears 4 and through the respective leaves. This construction provides for independent movement of either stem with relation to the mounting, as will be evident. Immediately adjacent the junction of the leaf 9 with the barrel 7 of the stem 5 said stem is provided with a projection 12, extending beyond the plane of the stem and having a plain face 13 next or toward the stem 6, while said latter stem is also provided with a similar projection 14, the plain face 15 of which is toward the stem 5. The projections 12 and 14 are so arranged with relation to each other that when their plain faces 13 and 15 are in contact one or the other of the stems 5 or 6, as the case may be, will be at a direct right angle to the longitudinal plane of the barrel of the rifle, so that the sight-opening carried by either of the respective stems will be in perfect parallel relation with said barrel. The stem 5 is designed to receive a threaded pin 15, which is adapted to be screwed into the cored end of the barrel and is provided at its upper end with any of the usual sights 16. The barrel of the stem 6 is also adapted to receive a similar threaded pin 17, the upper end of which is bifurcated at 18 to receive said bifurcations, the lip 19 depending from a spring-yoke 20, designed to snugly embrace and hold the telescope 21, hereinafter more particularly described. The walls of the bifurcations 18 and also the depending lip 19 are provided with projections 22 and 23, respectively, having plain faces designed to contact when in use, the arrangement of said projections being such that when their plain faces are in contact the telescope 21, supported in the clip 20, projects at a right angle to the longitudinal length of the stem, thereby arranging said telescope in parallel relation to the rifle-barrel. It is to be understood that the depending lip 19 is pivotally secured between the walls of the bifurcation 18 through the medium of a pin 24, permitting swinging of the telescope in a forward direction independently of the stem, as illustrated in dotted lines in Fig. 4.

The telescope 21 comprises the usual barrel 25, in which is mounted the adjustable section 26, carrying the usual telescope-lens 27. The section 26 is exteriorly threaded to engage a threaded projection 28, projecting from a milled nut 29, mounted for revoluble movement upon the barrel 25, the projection 28 extending through an opening in said barrel and engaging the threads on the section 26, whereby revolution of the nut will adjust said section with relation to the barrel 25. The forward or sight end of the section 26 is provided with the usual lens 30, which in the use of the telescope for ordinary purposes is turned up into position to coöperate with the lens 27. The object end of the barrel 25 is provided with an extended lip 31, having a right-angle projecting end flange 32 extending partly around the circumference of said object end of the barrel and forming a recess for the reception of a sight 33. Diametrically opposite the center of the lip 31 I provide a catch 34, designed to receive a suitable set-screw 55, by which the sight 33 is secured in proper relation to the object end of the barrel.

In the construction described it will be noted that I am enabled to support two individual sight-stems from a single mounting and so construct these stems that when one is in elevated position for use it is so supported by the other stem as to insure its accurate position with relation to the length of the barrel. Furthermore, the telescope supported by one of the stems will also be maintained in positive parallel relation to the barrel when in position for use by means of the projections 22 and 23. Furthermore, I am enabled to use sights of various constructions with the telescope or sight stem, thereby adapting my improvement when applied to a rifle to meet practically all requirements of the user so far as sight necessities of the particular occasion may demand.

Having thus described the invention, what is claimed as new is—

1. The combination with a rifle, of a sight-mounting, a plurality of individual stems movably secured in the mounting and means carried by each of said stems adapted to coöperatively contact to insure the proper position of either of the stems with relation to the barrel.

2. The combination with a rifle, of a sight-mounting therefor, a plurality of stems movably secured in said mounting, and projections carried by the stem designed for respective contact to insure a proper position of the stem in use.

3. The combination with a rifle, of a sight-mounting therefor, a plurality of stems pivotally connected to said mounting, each of said stems being hollow to adjustably receive sight-supporting pins, and a telescope removably secured to one of said sight-supporting pins.

4. The combination with a rifle, of a sight-mounting therefor, a plurality of stems pivotally connected to said mounting, each of said stems being hollow to adjustably receive sight-supporting pins, a telescope removably secured to one of said sight-supporting pins, said telescope comprising a barrel, and an adjustable section, the object end of the barrel being provided with a sight-receiving recess.

5. A gun-sight comprising a plate formed with projecting ears, and a plurality of sight-carrying stems, one of said stems having a single projecting leaf, and the other of said stems being formed with a pair of similar leaves, said latter leaves being spaced apart to receive the first-mentioned leaf between them, and all of the leaves being pivotally secured between the ears and the plate.

In testimony whereof I affix my signature in presence of two witnesses.

WILFRED BRAITHWAITE.

Witnesses:
ANNA E. AUGUR,
ERNEST A. AUGUR.